United States Patent [19]
Beard et al.

[11] 4,393,861
[45] Jul. 19, 1983

[54] APPARATUS FOR THE UTILIZATION OF SOLAR ENERGY

[76] Inventors: Buddy M. Beard, 2856 Janelle; Joe M. Beard, 822 E. York Way, both of Sparks, Nev. 89431

[21] Appl. No.: 307,549

[22] Filed: Oct. 1, 1981

Related U.S. Application Data

[63] Continuation-in-part of Ser. No. 82,813, Oct. 9, 1979, abandoned.

[51] Int. Cl.³ .............................................. F24J 3/02
[52] U.S. Cl. .................................... 126/436; 126/429; 126/430; 126/431; 52/302; 52/304; 52/DIG. 2
[58] Field of Search ............... 126/430, 431, 428, 429, 126/436; 52/302, DIG. 2, 304

[56] References Cited

U.S. PATENT DOCUMENTS

| | | | |
|---|---|---|---|
| 4,062,347 | 12/1977 | Jensen | 126/400 |
| 4,069,809 | 1/1978 | Strand | 126/431 X |
| 4,069,971 | 1/1978 | Swanson | 126/427 X |
| 4,147,300 | 4/1979 | Milburn, Jr. | 126/427 |
| 4,262,653 | 4/1981 | Holland | 126/430 X |
| 4,295,415 | 10/1981 | Schneider, Jr. | 126/430 |
| 4,296,798 | 10/1981 | Schramm | 126/431 X |

Primary Examiner—Larry Jones
Attorney, Agent, or Firm—Townsend and Townsend

[57] ABSTRACT

Apparatus for the utilization of radiated solar energy to heat the interior space of a building includes a solar energy collector in the form of a south-facing wall, energy storage elements in the form of remaining wall structures that, in combination with the collector wall, define the interior space, and a combination of conduit and air moving apparatus to circulate air warmed by the solar energy collector wall to the storage walls, where energy is stored, and returning the exhausted air to the collector wall.

16 Claims, 5 Drawing Figures

APPARATUS FOR THE UTILIZATION OF SOLAR ENERGY

This is a continuation-in-part application of our co-pending U.S. patent application Ser. No. 082,813, field Oct. 9, 1979, now abandoned.

BACKGROUND OF THE INVENTION

1. Field of the Invention

This invention pertains generally to the field of solar energy utilization, and more particularly to a system that utilizes solar energy as a source of natural heat for basic home and commercial application. Moreover, the invention is particularly directed to apparatus wherein concrete block elements provide expanded surface for collection of the solar energy, mass for storage of the heat thereby generated, and passages for efficient transfer of the heat. A further aspect of the present invention resides in the capability of energy storage for cooling purposes.

2. Description of the Prior Art

The rapid depletion of natural energy sources such as oil and natural gas have recently caused great concern, and energy requirements for the future will necessitate new sources of energy to provide for our needs. One immediate source of abundant power is that of the sun.

Although solar energy has been used for quite some time as an energy source, systems for utilization of such energy have, in many instances, proved inefficient. Solar energy systems of the past and present generally consist of the following components: A collection device to concentrate solar energy in the form of heat, a medium (generally water or air) by which this heat can be transferred to a storage means, and apparatus by which the stored heat can eventually be used where and when required. Solar heating systems of this design have generally been expensive to construct because of the added cost of the several separate system components, and have generally been inefficient. Inefficiencies within these systems have primarily been caused by the collection of solar heat at relatively high temperatures, but the inadequacy of present methods of storing collected solar energy and distributing the stored energy, along with various other weak points, have also contributed to system inefficiencies.

Many of these solar energy systems utilize roof-mounted collector panels which can be an expensive item in solar home construction. Additionally, these solar energy systems suffer a variety of other problems, depending upon the climate in which they are used. For example, solar energy systems utilizing freezable fluids as the heat transfer medium must be protected when operated in areas capable of experiencing temperature drops below that of the freezing point of the medium. This protection apparatus adds to the expense of the overall system, both in terms of purchase and continued maintenance.

Further, many of these solar energy systems utilize solar energy for a single, dedicated purpose: heating. They are not capable of cooling an interior space when warmer climates are experienced. Thus, in order to provide cooling capability, the building must be provided with additional equipment.

SUMMARY OF THE INVENTION

It is therefore an important object of this invention to provide a new and economically feasible system for heating buildings operated wholly or in part with solar energy.

It is also an object of this invention to provide an efficient solar energy collector which makes use of an improved heat absorption element, and which is further made more efficient by an improved means of transferring heat to storage.

Another important object of this invention is to provide additional collector efficiency through the added function of radiant heat transfer of the residual heat stored within the collector elements.

It is a further object of this invention to provide a method of low cost storage of the solar heat.

It is still a further object of this invention to provide a simple and efficacious means of heat distribution so said heat may be used as required to meet the building's needs.

A yet additional object of the present invention is to utilize the heating system provided in reverse for summer cooling by storing available cooler temperatures in certain components of the system for later use.

These purposes and objects of the present invention are obtained by wrapping the interior space to be warmed or cooled in a mass of masonary and controlling the temperature of that masonary. The effect of the present invention is to provide a heating/cooling system which has as its major emphasis radiant control.

A recent publication of the American Society of Heating, Refrigeration and Air Conditioning Engineers (ASHRAE) Systems Handbook states:

> In searching for the correct conditions which will be compatible with the physiological demands of the human body, no system can be rated as completely satisfactory which does not satisfy the three main factors controlling the heat loss from the human body: namely, radiation, convection, and evaporation. The greatest of these losses is that due to radiation, which, physiologically appears to be the most important. In spite of this, however, it rarely receives consideration in any type of air conditioning system, and is ignored entirely in all types of warm air or convected heat systems. We must conclude, therefore, that the usual methods of heating and cooling are basically inadequate, since no system can produce conditions compatible with the physiological demands of the human body, unless radiation losses are satisfied in some way. (ASHRAE Systems Handbook, 1976).

The underlying aspect of the present invention focuses primarily on the radiation losses experienced by controlling the surface temperatures of the walls that define the interior area. The invention operates to efficiently heat an interior space by the following method:

(1) A building wall having a south or southerly exposure is uniquely constructed, in part using concrete block material, in such a fashion as to allow for in-depth absorption of primary (direct) solar radiation and secondary solar radiation, and also to allow for removal of the collected solar energy (i.e., heat) by passage of air through and around the wall.

(2) Remaining building walls, or portions thereof, are uniquely constructed, in part using concrete block material, in such a fashion as to provide expanded surfaces for optimum heat exchange, and also to allow for heat distribution by passage of air through and around the remaining walls.

(3) Using a combination of conduits and blowers, air is passed over the surface of the collector (south-facing)

wall, and an exchange of energy is effected to heat the air.

(4) The heated air is then conducted to the storage (non-south-facing) walls and a reverse energy change takes place: The storage walls receive the energy from the air to become heated and the air, in turn, is cooled. Once the inducted air has given up its heat to the storage walls, it is then either exhausted or else recirculated through the system.

The energy (heat) thus distributed and stored in the storage walls together with the retained (residual) energy of the south-facing wall is used, as required, for the building's heating needs by radiant transfer.

Valves in the air distribution system can be regulated so that the air is directed, in direct or indirect contact, to portions of the system rather than to the system in its entirety so as to achieve selective distribution of energy storage, thereby obtaining temperature control by limiting subsequent dispersion of radiant energy to those selected areas.

Additional temperature control can be achieved by use of valves in the air distribution system which allow introduction of fresh outside air into selected portions of the system, thereby limiting subsequent dispersion of radiant energy to the selected areas of the building.

In the preferred embodiment of the invention, the south-facing, collector wall of a building structure is formed from concrete blocks that are provided with a plurality of substantially horizontally oriented apertures therethrough. The exterior and interior surfaces of the collector wall are respectively covered by exterior and interior panels, which are attached to the collector wall surfaces in confronting, spaced relation. The exterior panel is preferably transparent, and the interior panel can also be transparent if desired to provide viewing through the collector wall. Attachment of the panels, in combination with the apertures formed in the collector wall, provide a series of serpentine air passages through which air can be forced for the transfer of energy from the wall to the air.

The remaining non-south-facing storage walls of the building structure are also constructed from concrete blocks. The interior surface of each of the storage walls is covered by a second inner panel that is attached in confronting spaced relation forming air passages therebetween.

Air is communicated between the collector and the storage walls by an air conduit formed in the foundation of the building structure. An air moving device, such as a blower, causes air movement through the serpentine passages formed in the collector wall where energy is transmitted to the air, through the air conduit formed in the foundation to the storage wall where energy contained in the air is removed and stored. The air is then returned via the air conduit to the collector wall where the process begins again.

The efficient transfer of heat is of primary importance to the overall effectiveness of the system of the present invention. When, as is common with most other past and present solar energy collection systems, surface temperatures of the material used as a solar radiation absorber reach or exceed 150° F., collector efficiency is typically less than 25%, measured in terms of percentage of energy available for collection. The collector wall of the present invention achieves improved performance by virtue of its expanded surface which is a result of the physical shape of collector wall elements and of the rough surface texture of materials (concrete blocks) from which the collector wall is constructed. The same expanded surface allows for more intimate contact with the air which is passed through the collector elements, thus enhancing convective heat exchange between the collector and the heat transfer medium (air) used to remove and transport solar heat away from the collector.

Collector wall efficiency is further enhanced through utilization of an extended outermost transparent cover which, in the preferred embodiment, forms a greenhouse like enclosure that houses the exterior surface, and its covering exterior panel, of the collector wall. The purpose of this additional cover is to gain beneficial use of the solar radiation striking the horizontal surface immediately in front of the vertical collector wall.

Now, when collector surface temperatures are maintained below 90° F., as is easily accomplished by the present invention, collector efficiencies in excess of 70% are achievable. The solar energy obtained by this method is, although relatively large in terms of quantity, appreciably lower in temperature than is usually considered practical for solar heating applications. The present invention overcomes these problems by the unique construction of the non-south-facing storage walls, which provide sufficient surface area for convective heat exchange from the heat transfer medium (air) to storage, which in this instance is the wall material, and by meeting the heating needs of the interior areas of the building primarily by radiant heat transfer from perimeter walls which are warmed by the mass storage and in turn keep all interior surfaces at a relatively uniform temperature.

Although this summation pertains to a heating system, it also functions to provide for summertime cooling as follows: During the day, the collector wall is shielded from solar radiation. In the evenings, cool night air is drawn into and circulated through the system to remove and exhaust heat from the mass storage (which comprises the storage wall and, to a lesser extent, the collector wall), thereby causing a reduction of temperatures within the building's interior. Thus, the conduit system used to conduct the air flow from the collector wall to the storage wall, and back again, is provided with an inlet and an outlet that may be selectively opened or closed to the atmosphere for receiving air from and exhausting air to outside the building. In the evenings and at night when cooler nighttime temperatures are encountered, the inlet aperture is opened to draw in the cooler nighttime air, which is circulated via the combination of conduits to the collector and storage walls, storing the "coolness" for use throughout the upcoming day or days. This benefit is obtained even if additional cooling is required; the work to be performed by any supplemental cooling unit is reduced by operation of the system of the present invention.

The foregoing and further and more specific purposes, objects and advantages of the present invention will become readily apparent to those skilled in the art from the following detailed description, taken in conjunction with the accompanying drawing.

BRIEF DESCRIPTION OF THE DRAWINGS

Referring to the accompanying drawings, a particular embodiment of the present invention is illustrated wherein.

DESCRIPTION OF THE PREFERRED EMBODIMENT

A. Construction

Figure 1:
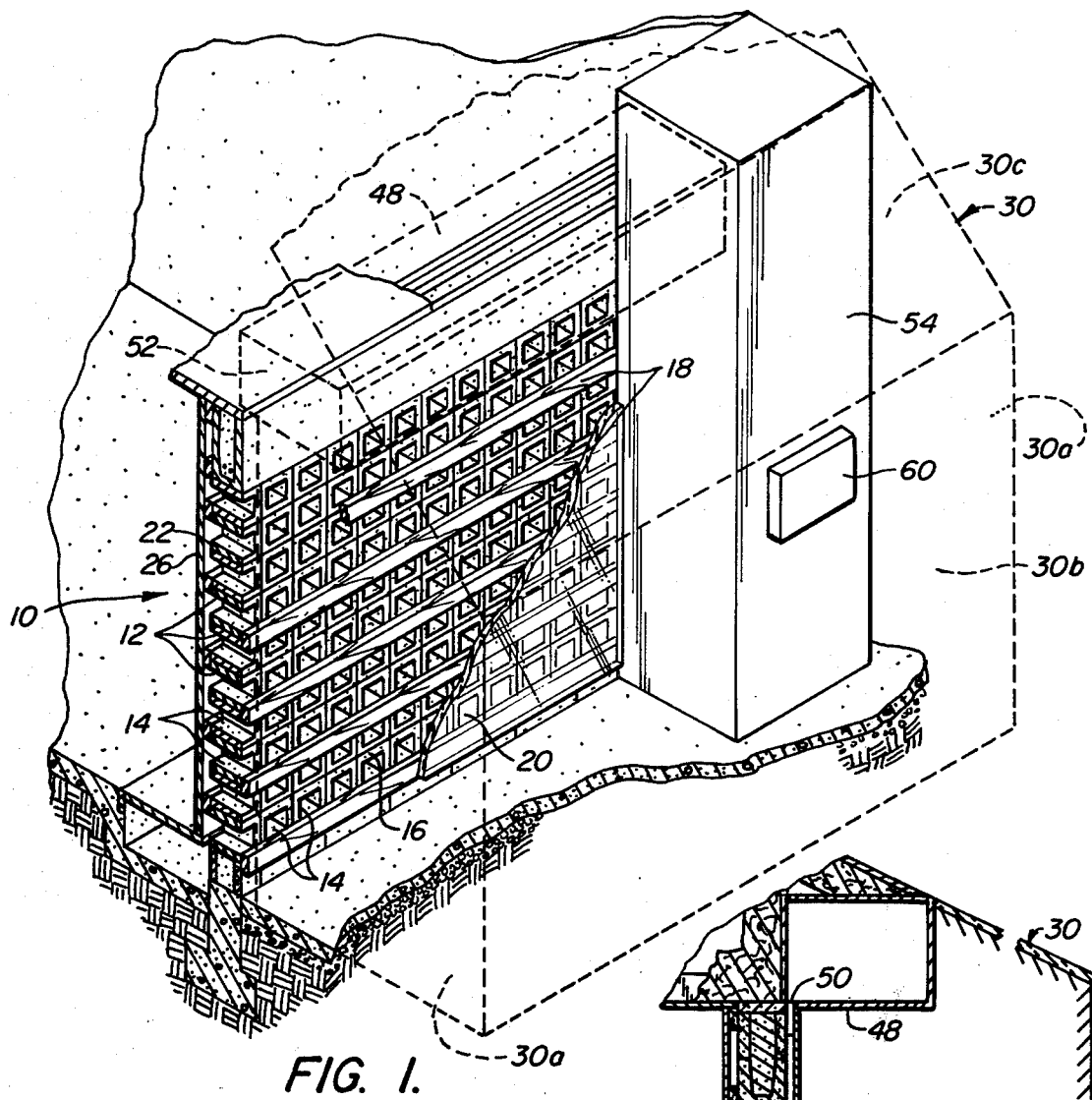
FIG. 1 is an isometric view of a south-facing collector wall of the present invention constructed in accordance with the teachings of the present invention.

Referring to the drawings, and particularly to FIG. 1, there is illustrated a south-facing or collector wall, designated generally with the reference numeral 10, formed in accordance with the present invention. The collector wall 10 is constructed from a plurality of concrete blocks 12, having formed therethrough generally horizontally oriented apertures 14. Attached to the exterior surface 16 by furrings 18 is a transparent panel 20. Attached to and covering the interior surface 22 of the collector wall 10, by furrings 24 (FIG. 2), is an interior panel 26, which, if desired, may also be transparent in order to allow viewing through the collector wall.

An outermost transparent covering 30, including side walls 30a, front wall 30b, and top wall 30c, is formed to enclose and house the exterior of the collector wall 10, yet allowing direct and diffuse components of solar insolation to pass therethrough, as well as through the transparent panel 20, and then be absorbed by the concrete blocks 12. For purposes that will be explained further below, the interior of the covering 30 is provided with venetian blind apparatus 31 to selectively control the amount of solar radiation that passes to the collector wall 10. Preferably, the concrete blocks 12 are fabricated to have a dark absorbing color.

Figure 2:
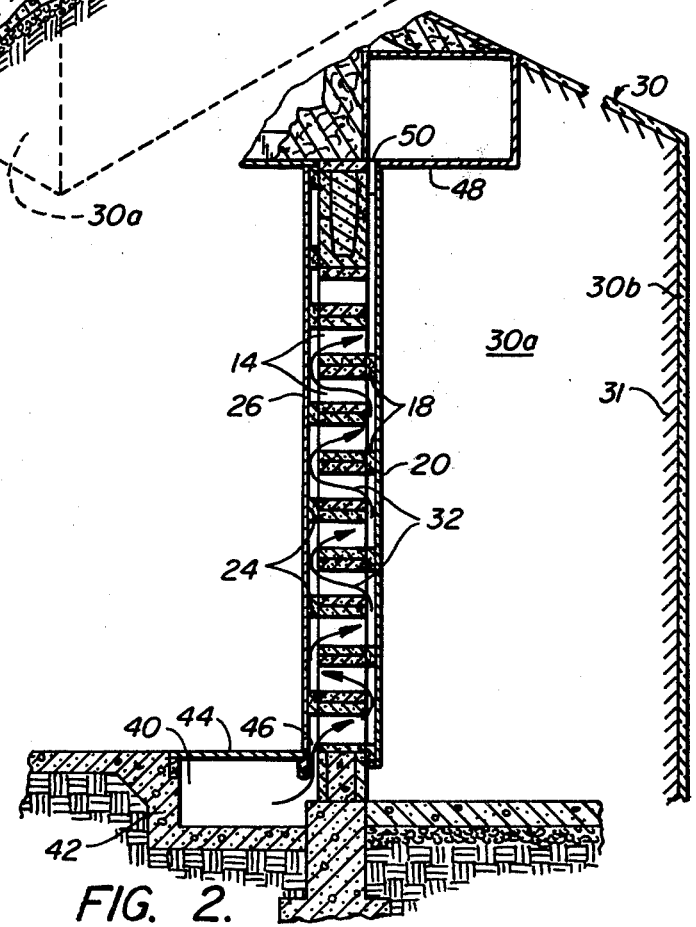
FIG. 2 is a cross-sectional view of the collector wall of FIG. 1.

The exterior and inner panels 20 and 26, respectively as more particularly illustrated in FIG. 2, are affixed to the apertured concrete blocks 12 in a manner that forms air passages that allow air to travel from the lower portion of the collector 10 wall to the upper portions in a serpentine manner, illustrated by the arrows 32, across the surfaces of the concrete blocks 12. This passage of air, being in heat exchange relation with the concrete blocks 12, serves as a heat transfer medium by which heat is transported to or from these energy storage walls described below.

Air circulation is effected, in part, by an air duct 40 that is formed in the foundation 42 of the building structure of which the collector wall 10 is a part. A cover plate 44 overlies the air duct 40 and forms a part of the flooring of the structure. As shown in FIGS. 1 and 2, the air duct 40 is formed so that it is adjacent the interior surface of the collector wall 10, and the interior panel 26 extends to and cooperatively abuts the cover plate 44, forming ingress passages 46 (FIG. 2) that allow the passage of air from the air duct 40 to the collector wall 10.

Located at the top of the collector wall 10 is an air plenum 48 which has a longitudinal opening 50 that receives the passage of air from the collector wall 10. The plenum, which is closed at one end 52 (FIG. 1), communicates air from the passage wall 10 to a fan housing 54.

Figure 3:
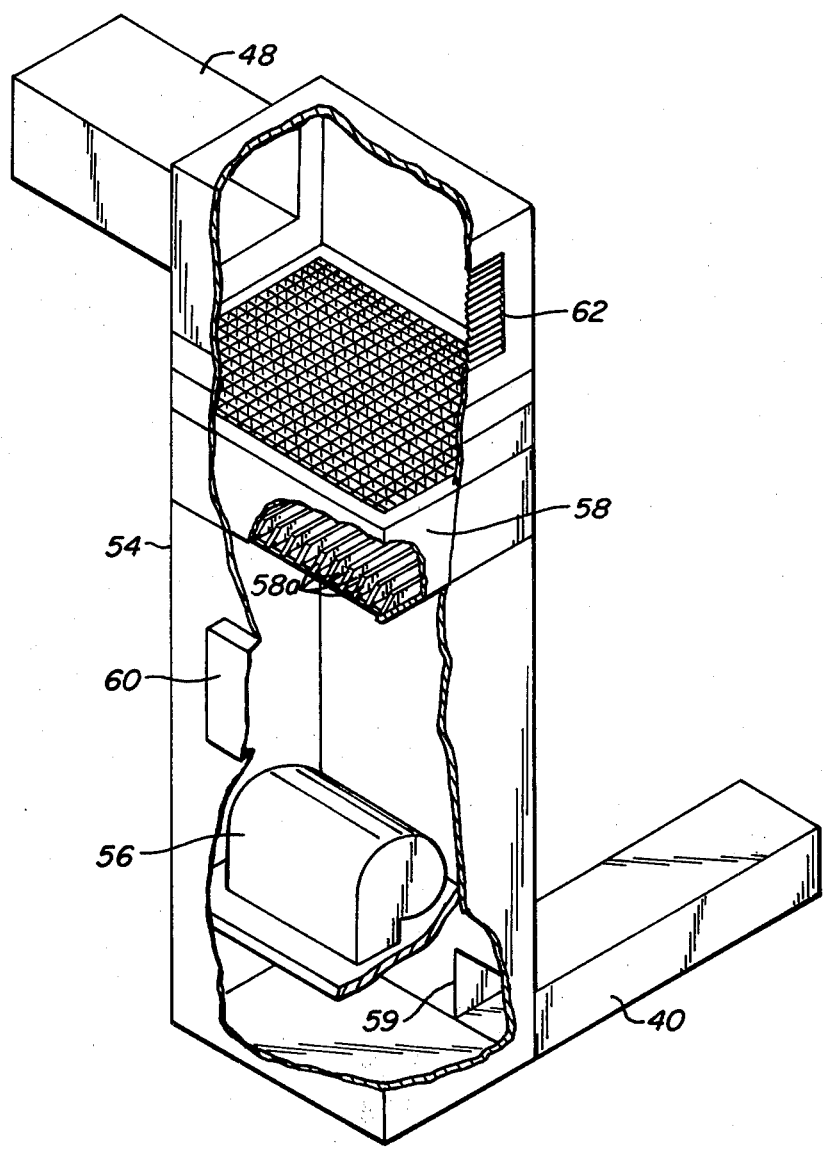
FIG. 3 is an isometric view, partly in section, of a blower housing and blower used to move air through the system.

As more particularly shown in FIG. 3, the fan housing 54 contains a primary air mover in the form of a fan 56. The fan housing 54 also contains a supplemental heater/cooler unit 58, the latter being used to provide a supplementary heating or cooling of the air circulated through the system. The supplemental heater/cooler unit 58 also includes a damper formed from a plurality of adjacent pivotal slates 58a that function to selectively allow or inhibit air flow through the supplemental heater/cooler unit 58. The function of the damper portion of the supplemental heater/cooler unit 58 will be described below in connection with use of the invention for cooling an interior area. Formed at the lower portion of the fan housing 54 is an opening 59 that communicates with the air duct 40 formed in the foundation of the building structure.

The fan enclosure 54 is further provided with an air intake 60 that selectively opens the fan enclosure 54 to outside air, and an exhaust grill 62 which also can selectively open to exhaust air into the outside atmosphere.

Figure 4:
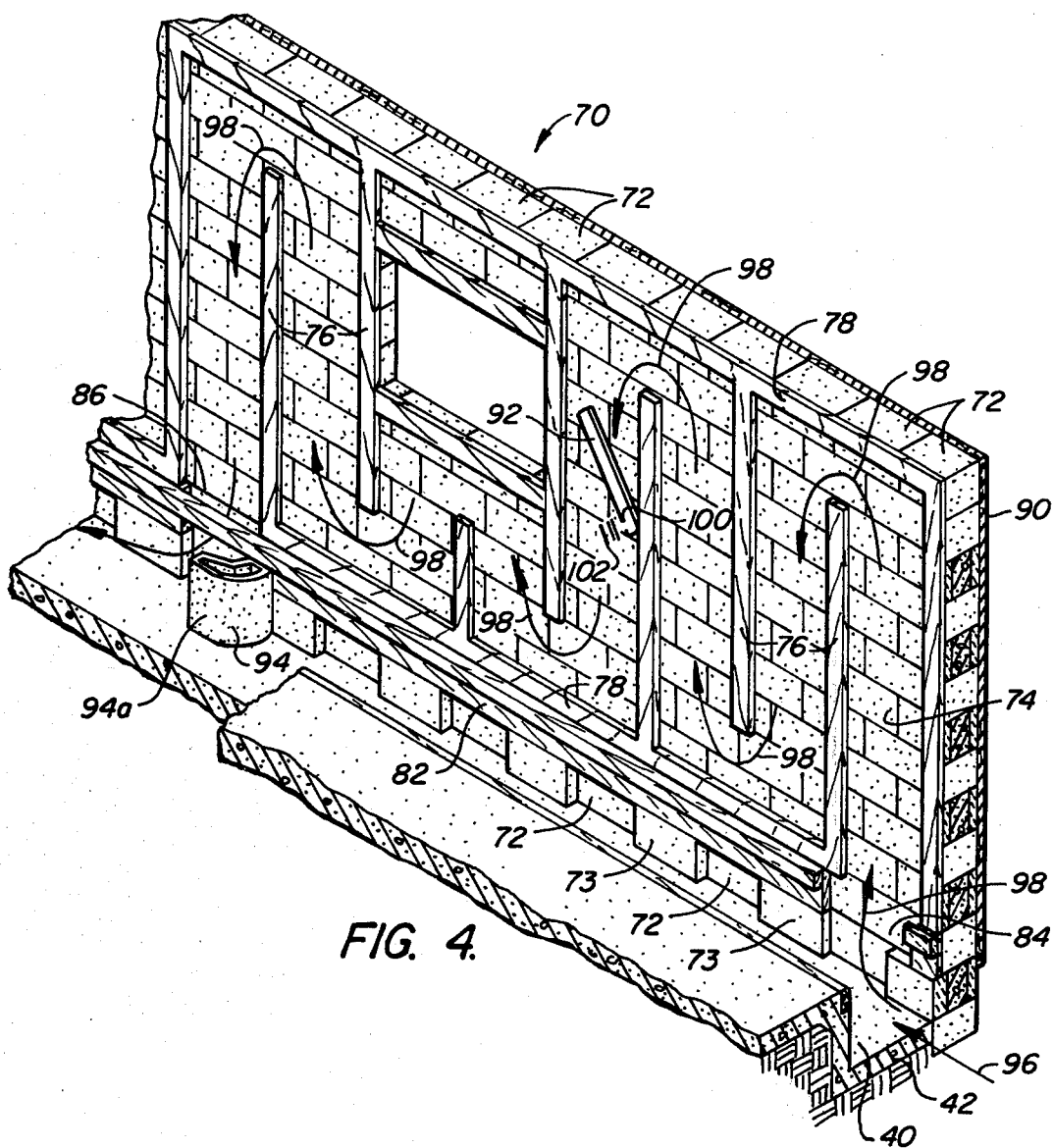
FIG. 4 is an isometric view of a non-south-facing storage wall constructed in accordance with the present invention.

In the preferred embodiment, all exterior walls of the building structure form the heating/cooling system of the present invention, with the south-facing wall forming the collector wall 10, and the remaining or non-south-facing wall forming the heat storage unit that receive and store energy. A portion of a non-south-facing wall is illustrated in FIG. 4, generally designated with the reference numeral 70. As shown, the storage wall 70 is constructed from concrete blocks 72. The base of the storage wall 70, which forms a sidewall of the air duct 40, is constructed from a linear arrangement of concrete blocks 72 interspersed with somewhat wider blocks 73. Attached to the interior surface 74 of the storage wall 70 are vertically and horizontally oriented furrings 76 and 78, respectively, which are used to affix an interior finish panel 80 (FIG. 5) to the storage wall 70, covering the interior surface 74 thereof. The furrings 76 and 78 are spaced apart from one another, as illustrated in FIG. 4, to form channels between the interior finish panel 80 and the surface 74 of the storage wall 10. A baseboard 82 forms, with the wider base blocks 73, openings such as at 84 and 86 that communicate the air channels formed by the furrings 76, 78 to the air duct 40.

Attached to the exterior surface of the storage wall 70 is an insulation panel 90 to retard the loss of stored thermal energy from the storage wall to the exterior of the building structure. The insulation 90 is preferably protected from the elements by an exterior finish (not shown). The materials and methods of application of the insulation panel 90 and exterior finish are well known in the art.

Mounted adjacent the opening 86 of the storage wall 70, and in the air conduit 40, is a restriction block 94. The purpose of the restriction block 94 is to create a low pressure area immediately proximate the opening 86. For example, assume that air flow in the air duct 40 is in the direction of the arrow 96. This air flow encounters the restriction block 94 and causes a low pressure to be created immediately behind (downstream) the restriction block 94, at the (egress) opening 86. This low pressure, in turn, causes air flow from the relatively higher air pressure located at the (ingress) opening 84 through the air channels formed by the furrings 76 and 78 in the direction indicated by the arrows 98. In this manner, air heated by energy transfer from the collector wall is communicated and, in turn, transferred for storage to the storage wall 70.

It should be noted that, alternatively, the restriction block 94 can be reversed so that the extension 94a points upstream the air flow (i.e., opposite the direction shown in FIG. 4) and the block positioned adjacent, but downstream of, opening 84. Again, a high pressure region is created at opening 84, relative to opening 86, to air flow through the air channels formed by furrings 76 and 78.

Air flow through the air channels formed by the furrings 76, 78 may be regulated by a damper formed from a damper arm 90 that is pivotally attached in the air channel at 100. A handle mechanism 102, structured to protrude through the interior finish panel 80, operates to pivot the damper arm 98, from a first position allowing a substantial air flow through the air channel, through various intermediate positions for limiting air flow, to a closed position stopping air flow therethrough.

Figure 5:
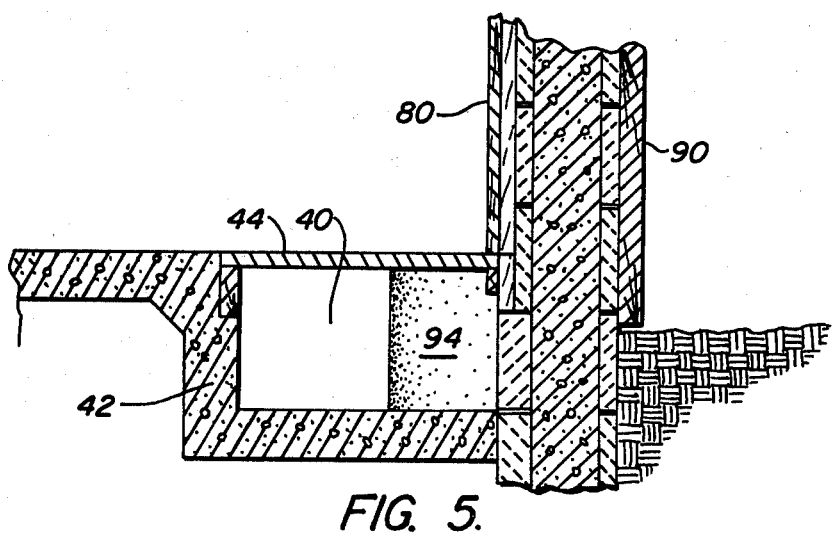
FIG. 5 is a cross-sectional view of a portion of the storage wall of FIG. 4 and the foundation, illustrating the conduit formed in the foundation for circulating air between the collector and storage walls.

It should be noted that, in FIG. 4, complete structure of the storage wall 70 would include the attachment of the interior wall 80 to the furrings 76, 78, covering the interior surface 74. The interior panel 80 has not been included in FIG. 4 (but is shown in FIG. 5) in order to present clearly the internal structure of the air channels formed in the space between the interior finish panel 80 and surface 74 of the storage wall.

B. Operation

Constructed as described above, a closed system for circulating air is formed by the collector wall 10 (i.e., the apertured blocks 12 and outer and inner panels 20, 26, respectively), the air plenum 48, fan housing 54 (with the damper of the supplemental heating/damper unit 58 set to allow air flow therethrough), air duct 40, and the air channels formed on the interior surface 74 of the storage walls 70. In operation, therefore, solar energy is radiated through the transparent outer cover 30 and the transparent exterior panel 20 to the apertured concrete blocks 12 that form the collector wall 10. Air is circulated by the fan 56 in a manner that removes air from the air duct 40 at the collector wall 10, and causing the air to travel the serpentine route formed in the collector wall by the apertures 14 and exterior and interior panels 20, 26, respectively. As the air passes across the solar heated blocks 12, heat is transferred from the blocks to the air.

The air warmed by the blocks 12 of the collector wall 10 is scavaged by the plenum 48 and communicated to the fan enclosure 54 where it is conducted and reintroduced to the air duct 40 at the opening 59 of the fan housing. The warmed air is then communicated to the storage walls 70 by the air duct 40, introduced into the air channels of the storage wall 70 and brought into heat exchange relation with the concrete blocks 72. The thermal energy carried by the warmed air is transferred to the storage blocks 70 and the exhausted (cooler) air reintroduced into the air duct 40 and returned to the collector wall 10 where it is reheated. In this mode of operation, heating the interior areas of a building structure encircled by the collector wall 10 and storage walls 70 is affected by radiant transfer of heat from the (warmed) walls which contain stored heat in the concrete blocks 12 (of collector wall 10) and concrete blocks 72 (of storage walls 70). The fan 56 will not operate unless air from the collector wall 10 has the potential for heat transfer to the storage wall 70.

Described above is the heating mode of operation. However, as hereinbefore noted, the system may also be used to cool the interior space surrounded by the collector and storage walls 10 and 70, respectively. In this case, the damper contained in the supplemental heating/damper unit 58 is operated to inhibit air flow therethrough. The air intake 60 is opened to the atmosphere so that cool air from outside the building is drawn into the fan housing 54. This cooler air is conducted by the fan 56 to the air duct 40 and to the storage wall 70 where it may be placed in heat exchange relationship for purposes of cooling, or prevention of overheating. The cooler air withdraws heat from the storage wall 70, as well as collector wall 10, resulting in heated air that may be exhausted from the air circulating system through the exhaust opening 62 to the outside atmosphere.

During the day, the venetian blind apparatus 31 is operated to shield the collector wall 10 from solar radiation.

During periods when heating is required but sufficient solar heat is not present, or during periods when cooling is desired but cool storage is insufficient, the supplementary (non-solar powered) heater/cooler 58 may be operated. In addition, the supplementary heater/cooler 58 may also be operated for the purpose of storing heat or cool for later use should there be an economic benefit for such manner of operation.

As an example, the following are design calculations for heating a building structure located in Reno, Nevada using the teachings of the present invention. The building structure is assumed to have approximately 400 square feet of floor space. Winter daily mean temperatures of 32° F. are typical of Reno, Nevada in January. Reno has yearly Heating Degree Days normally in excess of 6,000.

Assuming a building perimeter of 80 feet with 8 foot high walls, the building envelope area is approximately 1,000 square feet (wall area plus ceiling area). Further assuming an average thermal transmittance (U) value of 0.1 Btuh/ft.$^2$/degree F., hourly heat requirements to maintain the building's interior temperature at 72° F. would be 4,000 Btuh (1000×0.1×40) or 96,000 Btu/day for an average day in January, Reno's coldest winter month.

Total clear day direct solar irradiation on a south-facing vertical wall on a clear January day in Reno, Nevada, is approximately 1,726 Btu/ft$^2$. Assuming the entire south-facing wall of the structure of this example is available for use as a collector wall, the collector area would be 160 square feet (20 ft.×8). Were the collector efficiency to be only 60%, an efficiency easily obtainable by the present invention, the quantity of solar heat collected would be 165,696 Bty's (1,726×160×0.6). Clearly the system of the present invention will provide heat in excess of the building's needs on an average winter clear day.

Heat storage capability of the example building may be calculated by assuming a unit heat capacity of 52 Btu/F.°/sq. ft of wall area. Taking the wall area as 640 square feet (including collector wall, but neglecting openings for windows and doors) the potential heat storage capacity of the building is 33,280 Btu per degree F.; consequently, with mass storage fully charged at 75° F., storage capacity would be approximately adequate for three days of heating at average winter requirements in the total absence of useful solar collection before dropping below the roughly 65° F. lower end of the human comfort range.

We claim:

1. A system for heating an interior space of a building, the system comprising:
   collector wall structure formed from a concrete material and having a generally interior-facing surface, an opposed exterior surface, and a plurality of apertures communicating the interior-facing and exterior surfaces to one another;
   an exterior panel formed from a material transparent to solar energy, a first interior panel, and means for respectively mounting said exterior and first interior panels in spaced relation to the exterior and interior-facing surfaces of the collector wall structure to form first air passages comprising spacing between the exterior panel and the exterior surface, the first interior panel and the interior-facing surface and the plurality of apertures;
   storage wall structure formed from a concrete material and having a second interior-facing surface, a second interior panel, and means for mounting the second interior panel to the second interior-facing surface to form at least a second air passage therebetween;
   conduit means intercoupling the first and second air passages for communicating air from the first air passages to the second air passage; and
   air moving means operably coupled to the conduit means for moving air from the first air passages to the second passage and back again via the conduit means.

2. The system of claim 1, including means for mounting the exterior and first interior panels to the collector wall structure to form with said apertures first air passages of a generally serpentine configuration.

3. The system of claim 1, including an enclosure structure mounted to the collector wall structure and forming an enclosed space containing the exterior panel, the enclosure structure being fabricated substantially from material that is transparent to solar radiation.

4. The system of claim 1, including insulative material mounted to and covering an outer surface of the storage wall structure.

5. The system of claim 1, the first and second interior panels being fabricated from gypsum board.

6. The system of claim 1, and wherein the conduit means includes inlet and outlet conduits that are open to the atmosphere exterior of said building, and including means for selectively withdrawing air from the atmosphere through the inlet conduit and for circulating the air via the first and second passages to the outlet conduit for expulsion back into the atmosphere.

7. The system of claim 1, the building including foundation structure having formed therein a passageway forming at least a part of said conduit means.

8. A system for heating an interior area of a building, comprising:
   a concrete collector wall having a generally southerly facing exterior surface, an interior surface, and a plurality of apertures therethrough communicating the exterior and interior surfaces to one another;
   an exterior panel formed from a material transparent to solar energy, mounted in adjacent, spaced relation to the exterior surface of the collector wall;
   a first interior panel mounted in adjacent spaced relation to the inner surface of the collector wall, the exterior and first interior panels forming a plurality of first air passages with the collector wall and the apertures formed therein;
   an enclosure formed from a material transparent to solar energy mounted to the collector wall and forming an area that encloses and contains the exterior surface of the collector wall and the exterior panel mounted thereto;
   concrete storage wall structure forming at least one wall of the interior area, the storage wall structure having an interior-facing surface;
   a second interior panel mounted in spaced relation to the interior-facing surface of the storage wall and forming an second air passage therewith; and
   air circulating means, including conduit means, intercoupling the first and second air passages for movement of air through the first air passages and to and through the second passage and back to the first air passages.

9. The system of claim 8, wherein the apertures formed in the collector wall extend in a direction having a predominantly horizontal component.

10. The system of claim 8, wherein the apertures formed in the collector wall extend in a direction having a predominantly horizontal component, and the first interior panel formed from a transparent material.

11. The system of claim 8, the building including a foundation structure having formed therein a passageway forming at least a part of the conduit means; and means for forming ingress and egress openings between the passageway and the second air passages.

12. The system of claim 11, including restriction means mounted in the passageway adjacent and upstream of said egress opening for creating a pressure proximate the egress opening lower than that proximate the ingress opening.

13. The system of claim 8, the air circulating means including means for regulating the movement of air.

14. The system of claim 8, the air circulating means including means for regulating the movement of air through the second passage.

15. The system of claim 8, wherein the air circulating means includes air intake means operable to selectively open and receive air from the exterior of said building.

16. The system of claim 15, the air circulating means including air exhaust means operable to selectively open to the exterior of said building for exhausting air circulated through said system.

* * * * *